March 19, 1957  S. H. COOK  2,785,815
BOAT TRAILER

Filed Nov. 12, 1954  3 Sheets-Sheet 2

Simon H. Cook
INVENTOR.

BY *Clarence A. O'Brien*
*and Harvey B. Jacobson*
Attorneys

March 19, 1957
S. H. COOK
2,785,815
BOAT TRAILER
Filed Nov. 12, 1954
3 Sheets-Sheet 3
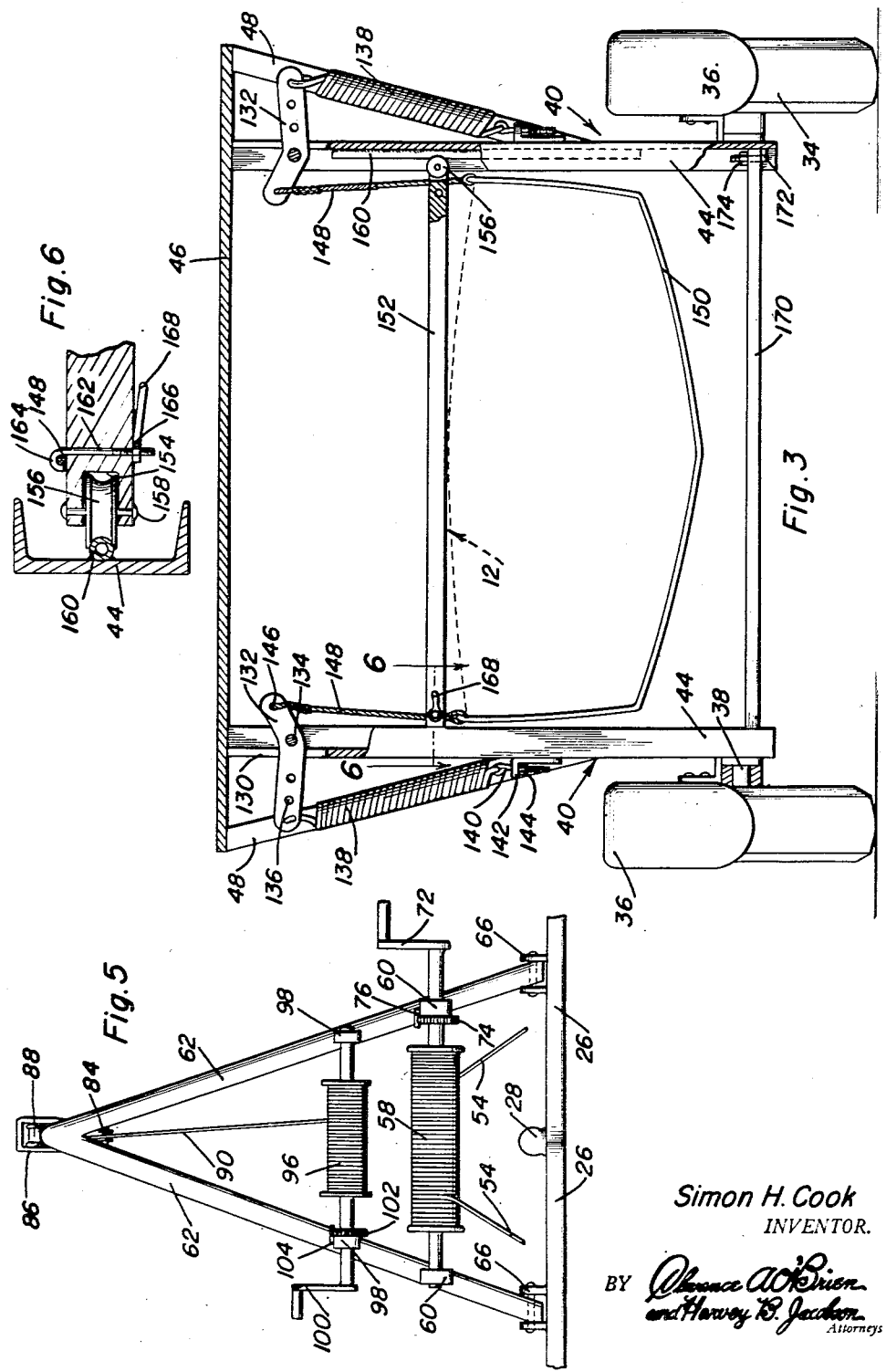
Simon H. Cook
INVENTOR.

2,785,815
// Patented Mar. 19, 1957

2,785,815

BOAT TRAILER

Simon H. Cook, Nampa, Idaho, assignor of fifty percent to Cleo H. Cook, Nampa, Idaho Application November 12, 1954, Serial No. 468,326

12 Claims. (Cl. 214—396)

This invention relates to a boat trailer, and more specifically provides new and useful improvements in boat trailers including means for loading and unloading a boat on the trailer.

An object of this invention is to provide a boat trailer including means for suspending a boat within a frame together with novel and improved means for raising and lowering the boat in relation to the trailer.

Another important object of the present invention is to provide a boat trailer for resiliently supporting one end thereof and including a novel arrangement of structural elements forming a mechanical lifting device for both ends of a boat.

Other important objects of the present invention reside in its simplicity of construction, ruggedness, safeness, ease of operation, its adaptability for its purposes, and its relatively inexpensive manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a vertical, sectional view taken substantially upon a plane passing along section line 3—3 of Figure 1, showing the details of construction of the rearmost pivotal members together with the resilient boat supporting means and the stabilizing bar and sway bar;

Figure 4 is a detailed vertical, sectional view taken substantially upon a plane passing along section line 4—4 of Figure 1 showing the boat rest for the forward part of the boat having the chocks thereon for engaging the bottom of the boat;

Figure 5 is a front end elevational view showing the two winch drums of the present invention together with the forward vertical pivotal member; and Figure 6 is a detailed, sectional view taken substantially upon a plane passing along section line 6—6 of Figure 3 showing the position of the sway bar in relation to the vertical side members wherein the boat may sway and move within certain limits.

Figure 1:
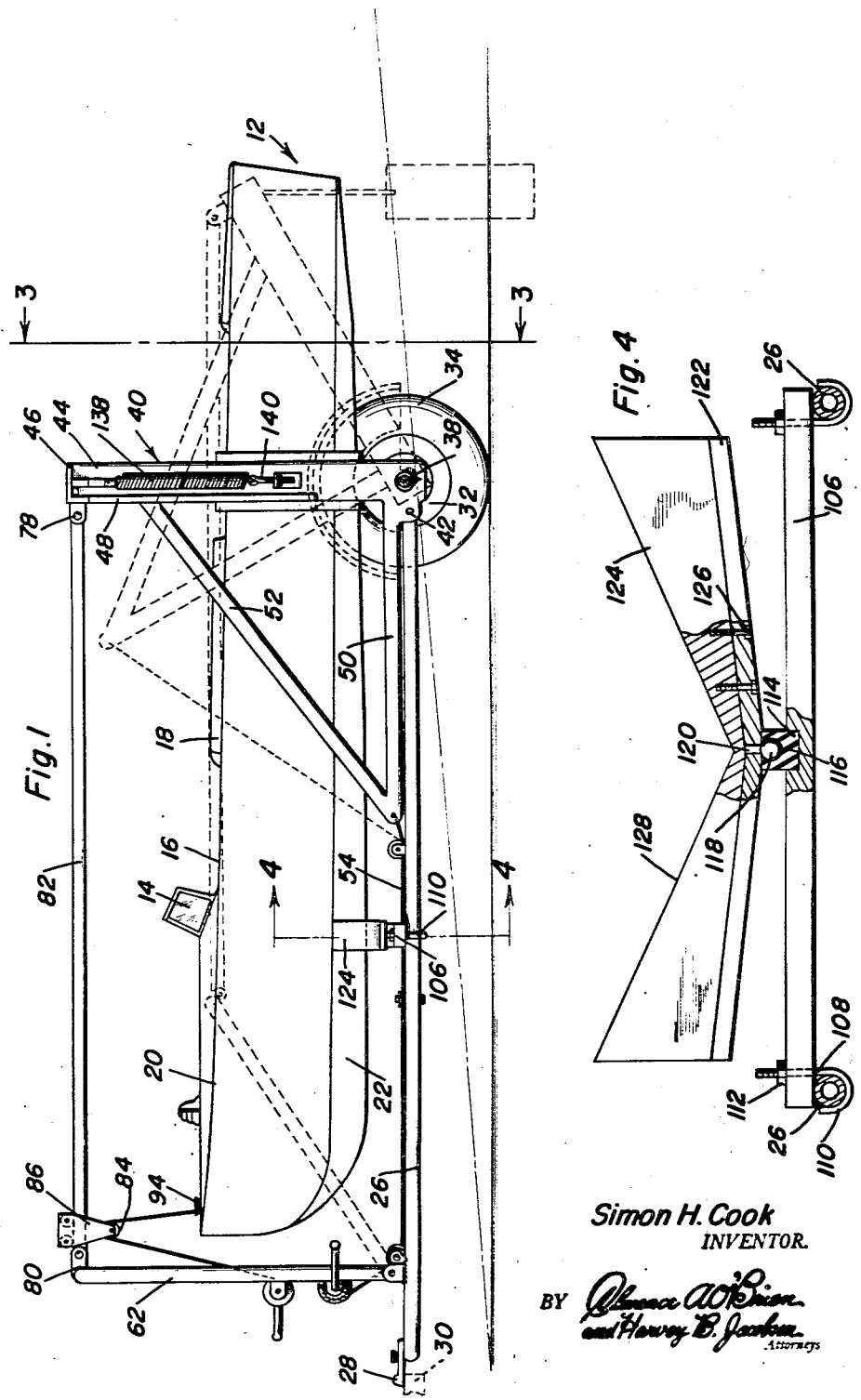
Figure 1 is a side elevational view of the boat trailer of the present invention showing a boat positioned therein and showing, in dotted lines the lowered position of the boat and boat trailer when unloading the boat.
Figure 2:
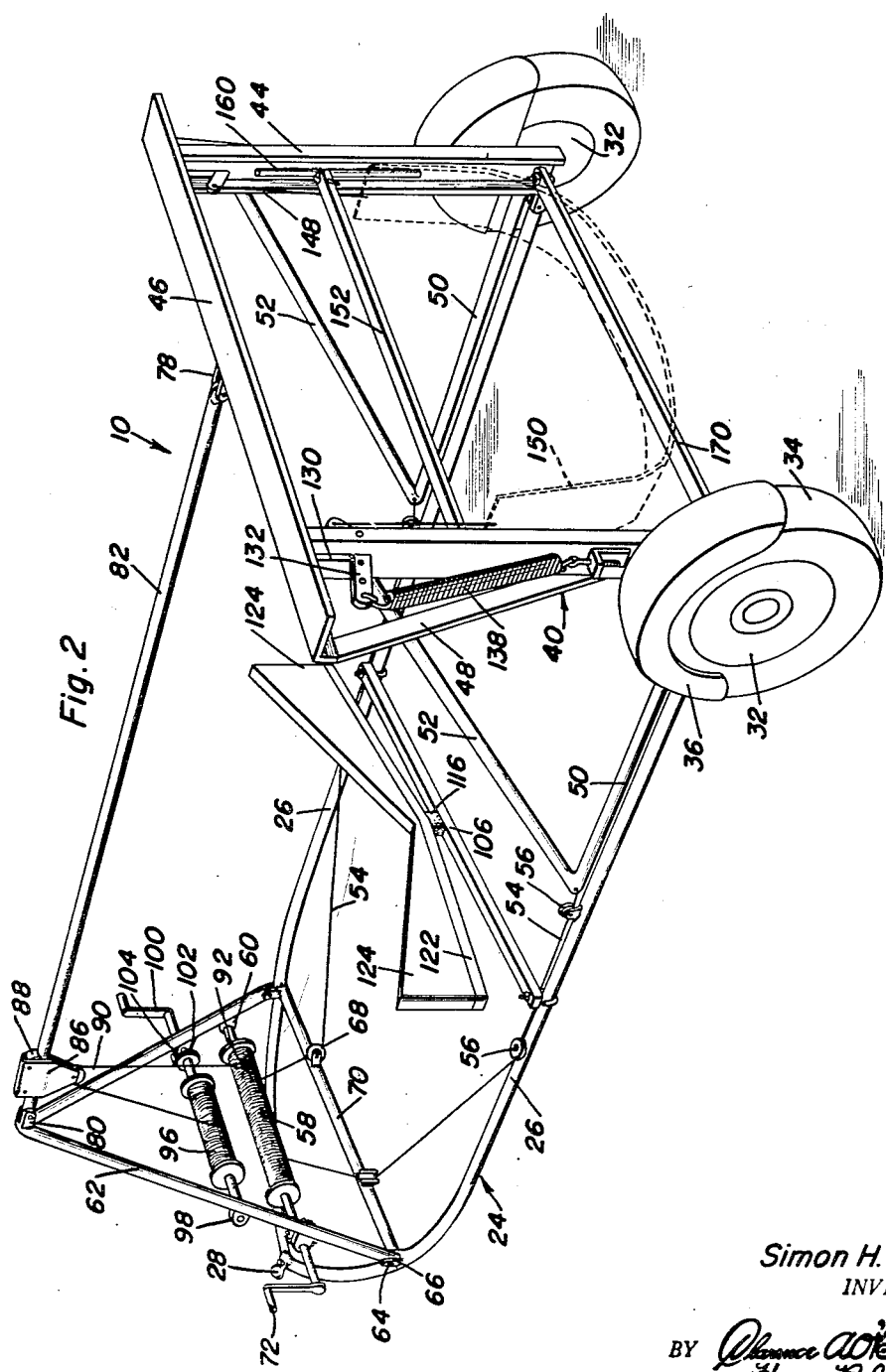
Figure 2 is a perspective view showing the details of construction of the boat trailer of the present invention with the boat removed.

Referring now specifically to the drawings, it will be seen that the numeral 10 generally designates the boat trailer of the present invention for supporting a boat generally designated by the numeral 12 wherein the boat 12 includes the usual windshield 14 forwardly of the cockpit 16 and the motor 18 and also includes sides 20 and a bottom 22 which is generally V-shaped. The boat trailer 10 includes a supporting frame generally designated by the numeral 24 which includes two longitudinal rails 26 in spaced parallel relation to each other which curve inwardly at their forward ends and terminate and are secured to each other at a forwardly extending hitch member 28 utilized for attaching the boat trailer 10 to a drawbar 30 of a towing vehicle, such as an automobile or the like. The frame 24 is supported in spaced relation to a supporting surface by a pair of supporting wheels 32 with one of the wheels 32 being located at the rear end of each longitudinal rail 26. The supporting wheels 32 include pneumatic tires 34 and fenders 36 which may be of any particular design and construction wherein the supporting wheels 32 are supported on suitable spindles with bearings and brakes, all of which are not shown.

In Figure 3, a supporting spindle 38 is shown for one of the supporting wheels 32 which is rigidly secured to a vertically disposed frame generally designated by the numeral 40, and each of the wheels 32 is provided with a spindle 38 and a vertically disposed frame that is rigid therewith wherein the frame 40 may pivot in relation to the supporting wheel 32 and the frame 40 is pivotally secured to the rear ends of the longitudinal rails 24 and 26 by pivot pins 42, thereby permitting pivotal movement of the vertically disposed frame 40 in relation to the longitudinal rails 26.

Each of the frames 40 includes a vertically disposed inwardly facing channel-shaped member 44 wherein the upper ends of the channel-shaped members 44 are interconnected by a rigid transverse bar 46 thereby forming a rigid construction between the supporting wheel 32. From the ends of the transverse bar 46, a brace bar 48 is provided which extends downwardly and is rigidly secured to the vertical channel-shaped member 44 in spaced relation to the upper end thereof, thereby forming a further reinforcement for the frame 40 and the frame 24. Extending forwardly from each of the vertically extending members 44 at the bottom thereof is an elongated member 50 that is generally perpendicular to the vertical members 44 and generally parallel to the longitudinal rails 26 of the frame 24. The end of the forwardly extending member 50 connected to each of the vertical members 44 is provided with an upwardly and rearwardly inclined frame member 52 which forms a rigid brace for the members 50, wherein the members 50 and 52 form substantially a triangle, with the vertical members 44.

The apex or juncture between the forwardly extending members 50 and the inclined member 52 is connected to a flexible cable 54 that extends along the longitudinal frame rails 26 and is guided by pulleys 56. It is noted that each of the frame assemblies 40 is connected to a cable 54, and the cables 54 are connected to a drum winch 58 that is mounted in suitable bearings 60 on a pair of upstanding converging members 62 pivotally mounted on the longitudinal rails 26 by pivot pins 64 extending through pivot lugs 66. The cables 54 extend through guide pulleys 68 mounted on a transverse bracing member 70 extending between the longitudinal rails 26 substantially at the bottoms of the upwardly converging rigid members 62 that are joined at their upper ends and form generally an upstanding triangle. One end of the drum winch 58 is provided with an operating handle 72 having a suitable ratchet gear 74 associated therewith together with a gravity operated pawl 76 for retaining the winch drum 58 in adjusted position, thereby permitting rearward pivotal movement of the frame assemblies 40 about the pivot axis of the spindle 38 and also raising the frame assemblies 40 about the pivot axis 38 for a purpose described hereinafter.

The central portion of the transverse bar 46 is provided with forwardly extending pivot lugs 78 and the upper end of the converging member 62 is provided with rearwardly extending pivot lugs 80 for pivotally receiving the remote ends of an interconnecting horizontal member 82 for freely supporting a pulley 84 on a pulley bracket 86 that is provided with rollers 88 that engage the upper surface of the horizontal member 82 for free longitudinal movement thereon. A cable 90 is positioned over the pulley 84 and includes a hook 92 on the free end thereof for engaging a fixture 94 on the boat 12 adjacent the forward end thereof. The other end of the cable 90 is positioned around a winch drum 96 journaled in suitable bearings 98 on the forward surface of the upwardly converging members 62 and one end of the winch drum 96 is provided with a handle 100, and the winch drum 96 is also provided with a ratchet gear 102 together with a spring actuated pawl 104 for retaining the cable 90 in adjusted position, thereby retaining the boat 12 in a lifted position and also permitting the boat 12 to be lowered in the desired manner.

Positioned forwardly of the frame assembly 40 and longitudinally adjustably mounted on the longitudinal rails 26 is a transverse bar 106 having a bolt 108 extending downwardly through each end thereof and terminating in an outwardly curved U-shaped portion 110 for engaging around a longitudinal rail 26. A clamping nut 112 is positioned on the upper end of the bolt 108 for engagement with the upper surface of the transverse bar 106, wherein by manipulation of the clamping nut 112, the bolts 108 may be loosened, thereby permitting longitudinal sliding movement of the transverse bar 106 on the longitudinal rails 26 of the frame 24. Centrally on the upper surface of the transverse bar 106 is provided a recess 114 for receiving a block of resilient material 116 which has a ball member 118 embedded therein. The ball member 118 is provided with an integrally formed projecting stud 120 mounted in a transverse base member 122 which has chocks 124 detachably secured thereto by fastening bolts 126. The chocks 124 generally form upwardly and outwardly inclined surfaces 128 for generally conforming to the contours of the V-shaped bottom 22 of the boat 12, thereby forming a boat rest for supporting the boat 12 generally adjacent the forward end thereof.

Referring now specifically to Figure 3, it will be seen that the upper end of each of the vertically extending channel-shaped members 44 is provided with a downwardly extending slot 130 for receiving a generally angulated link 132 pivoted adjacent its midpoint on a pivot pin 134 extending between the spaced webs of the channel-shaped member 44. The outermost end of each of the pivotal links 132 is provided with a plurality of apertures 136 for receiving one end of a tension resilient spring 138 which is generally positioned in a vertical manner with the lower end thereof secured to an eyebolt 140 extending through a bracket 142 on the outer surface of the vertical member 44 wherein the eyebolt 140 is secured to the bracket 142 in an adjustable manner by an adjusting nut 144, thereby adjusting the tension of the spring 138. By positioning the upper end of the spring 138 in selected apertures 136 in the link 132, the force of the downward pull of the spring 138 may be varied. Adjacent the inner end of the link 132 is provided an aperture 146 having a cable 148 secured therein. The lower end of each of the cables 148 is secured to a remote end of a flexible sling 150 which is generally constructed of rugged material and having substantial width thereto for engaging the bottom 22 and the sides 20 of the boat 12. It will be seen that the coaction of the springs 138 together with the suspending sling 150 will resiliently support the rear portion of the boat 12 between the vertical upright members 44 and the springs 138 will permit cushioning of any shocks and also prevent unnecessary damage to the boat from vibration.

Positioned across the upper surface of the rear portion of the boat 12 is a transverse sway bar 152 having recesses 154 in the ends thereof for rotatably receiving a roller 156 having a peripheral groove and journaled on a transverse pin 158. Each of the rollers 156 is provided with a peripheral groove which rollingly engages a vertically elongated tubular member 160 mounted on the inner surface of the channel-shaped members 44, thereby forming a vertical guide for the transverse sway bar 152. Adjacent each end of the sway bar 152 is provided a generally horizontally disposed bolt 162 having a U-bent portion 164 on one end thereof for engaging over the cable 148 and a clamping nut 166 having a handle 168 thereon is positioned on the other end of the bolt 162, thereby securely clamping the cable 148 to the sway bar 152, thereby forming a rigid unit wherein the sway bar 152 will move vertically with the cables 148, thereby forming a support for the boat wherein lateral sway of the boat 12 will be arrested and the vertical movement thereof will be guided. Extending between the lower ends of the vertically extending channel-shaped members 44 is a stabilizing or connecting bar 170 positioned over upstanding bolts 172 adjacent the lower ends of the vertical members 44 wherein the stabilizing bar 170 may be easily removed by removing nuts 174 on the bolts 172 thereby permitting the boat 12 to be lowered when desired.

In practical operation of the boat trailer 10 of the present invention, it will be seen that the boat 12 is supported at the forward end by cable 90 and hook 92 engaged with the fixture 94 adjacent the forward end of the boat 12 and the chocks 124 engaging the bottom 22 of the boat 12 adjacent the forward end thereof. The rear portion of the boat 12 is engaged by the flexible sling member 150 which is attached to the cables 148 that in turn are attached to the inner ends of the pivotal links 132 that are resiliently retained in generally horizontal position by the tension springs 138, thereby resiliently supporting the rear portion of the boat 12. When the boat is positioned within the boat trailer 10 of the present invention, the lower transverse bar 170 is positioned between the lower ends of the vertical channel-shaped members 44 and the bar 170 forms a rigid spacer for the bottom ends of the vertical members 44 as well as the rear ends of the longitudinal rails 26 and the supporting wheels 32. The sway bar 152 extending between the vertical members 44 and engaging the guide tubes 160 form a guide and limiting means for the swaying movement of the boat 12 since the ends of the sway bar 152 are rigidly attached to the cables 148 and since the cables 148 are directly connected to the sling 150, the boat 12 will be guided in its lateral swaying movement as well as in a vertical movement thereof.

When it is desired to lower the boat 12, it is first necessary to remove the transverse brace 170 and the transverse sway bar 152. The forward end of the boat 12 is then raised slightly, permitting the boat 12 to be disengaged from the chocks 124. The winch drum 58 is then operated to unwind the cable 54, thereby permitting the frame assemblies 40 including the vertical members 44 to pivot about the axis of the spindles 38, thereby lowering the rear end of the boat. It will be noted that the rigid connecting link 82 will pivot the converging members 62 in the same relation as the vertical members 44, thereby forming a pivotal parallelogram linkage, and the pulley bracket 86 will move on the horizontal rail 82 as desired for supporting and permitting rearward movement of the boat 12 during movement of the parallelogram frame.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A boat trailer comprising a wheeled frame, means for detachably securing the forward end of said frame to a towing vehicle, a pair of transversely spaced vertical members pivoted to said frame adjacent the rear thereof, a vertical member pivoted to said frame adjacent the front thereof, a connecting horizontal rigid member pivotally interconnecting the upper ends of said vertical members wherein said members together with said frame form a pivotal parallelogram, means for resiliently suspending the rear of a boat between the rear vertical members, means for suspending the front end of a boat from the horizontal member, and means for pivoting said members about their pivotal axes thereby raising and lowering the boat in relation to the wheeled frame.

2. A boat trailer comprising a wheeled frame, means for detachably securing the forward end of said frame to a towing vehicle, a pair of transversely spaced vertical members pivoted to said frame adjacent the rear thereof, a vertical member pivoted to said frame adjacent the front thereof, a connecting horizontal rigid member pivotally interconnecting the upper ends of said vertical members wherein said members together with said frame form a pivotal parallelogram, means for suspending the rear of a boat between the rear vertical members, means for suspending the front end of a boat from the horizontal member, and means for pivoting said members about their pivotal axes thereby raising and lowering the boat in relation to the wheeled frame, said means for suspending the front of the boat including a pulley freely longitudinally movable on said horizontal member, a flexible cable positioned over said pulley and having a free end adapted to be connected to a boat, a winch drum rotatably secured to said forward vertical member for winding the cable thereon for raising and lowering the front end of a boat.

3. A boat trailer comprising a wheeled frame, means for detachably securing the forward end of said frame to a towing vehicle, a pair of transversely spaced vertical members pivoted to said frame adjacent the rear thereof, a vertical member pivoted to said frame adjacent the front thereof, a connecting horizontal rigid member pivotally interconnecting the upper ends of said vertical members wherein said members together with said frame form a pivotal parallelogram, means for suspending the rear of a boat between the rear vertical members, means for suspending the front end of a boat from the horizontal member, and means for pivoting said members about their pivotal axes thereby raising and lowering the boat in relation to the wheeled frame, and a transverse cross-bar longitudinally adjustably mounted on said frame adjacent the front thereof, a boat rest resiliently and pivotally mounted on the upper surface of the cross-bar for engaging the undersurface of a boat adjacent the forward end thereof, said boat rest including chocks having outwardly and upwardly inclined surfaces for receiving the bottom of the boat.

4. A boat trailer comprising a wheeled frame, means for detachably securing the forward end of said frame to a towing vehicle, a pair of transversely spaced vertical members pivoted to said frame adjacent the rear thereof, a vertical member pivoted to said frame adjacent the front thereof, a connecting horizontal rigid member pivotally interconnecting the upper ends of said vertical members wherein said members together with said frame form a pivotal parallelogram, means for suspending the rear of a boat between the rear vertical members, means for suspending the front end of a boat from the horizontal member, and means for pivoting said members about their pivotal axes, thereby raising and lowering the boat in relation to the wheeled frame, said means for pivoting said members about their axes including a winch drum on said forward vertical member adjacent the bottom thereof, a flexible cable attached to said drum and having one end connected to one of said rear vertical members in vertically spaced relation to said pivotal connection between the frame and said one rear vertical member thereby permitting said rear vertical members to pivot to a rearwardly inclined position for raising and lowering a boat.

5. A boat trailer comprising a wheeled frame, means for detachably securing the forward end of said frame to a towing vehicle, a pair of transversely spaced vertical members pivoted to said frame adjacent the rear thereof, a vertical member pivoted to said frame adjacent the front thereof, a connecting horizontal rigid member pivotally interconnecting the upper ends of said vertical members wherein said members together with said frame form a pivotal parallelogram, means for suspending the rear of a boat between the rear vertical members, means for suspending the front end of a boat from the horizontal member, and means for pivoting said members about their pivotal axes, thereby raising and lowering the boat in relation to the wheeled frame, said means for suspending a rear of a boat including a flexible sling member, and resilient means securing remote ends of said sling to said vertical members.

6. A boat trailer comprising a wheeled frame, means for detachably securing the forward end of said frame to a towing vehicle, a pair of transversely spaced vertical members pivoted to said frame adjacent the rear thereof, a vertical member pivoted to said frame adjacent the front thereof, a connecting horizontal rigid member pivotally interconnecting the upper ends of said vertical members wherein said members together with said frame form a pivotal parallelogram, means for suspending the rear of a boat between the rear vertical members, means for suspending the front end of a boat from the horizontal member, and means for pivoting said members about their pivotal axes thereby raising and lowering the boat in relation to the wheeled frame, said rear vertical members being rigidly interconnected at the tops thereof by a transverse brace bar, and a removable stabilizing bar extending between the lower ends of rear vertical members for retaining the rear vertical members in spaced relation.

7. A boat trailer comprising a wheeled frame, means for detachably securing the forward end of said frame to a towing vehicle, a pair of transversely spaced vertical members pivoted to said frame adjacent the rear thereof, a vertical member pivoted to said frame adjacent the front thereof, a connecting horizontal rigid member pivotally interconnecting the upper ends of said vertical members wherein said members together with said frame form a pivotal parallelogram, means for suspending the rear of a boat between the rear vertical members, means for suspending the front end of a boat from the horizontal member, and means for pivoting said members about their pivotal axes, thereby raising and lowering the boat in relation to the wheeled frame, said means for suspending a rear of a boat including a flexible sling member, and resilient means securing remote ends of said sling to said vertical members, and a vertically moving sway bar vertically movably extending between said rear vertical members above said sling thereby retaining said boat in said sling and permitting limited movement thereof.

8. A boat trailer comprising a wheeled frame, means for detachably securing the forward end of said frame to a towing vehicle, a pair of transversely spaced vertical members pivoted to said frame adjacent the rear thereof, a vertical member pivoted to said frame adjacent the front thereof, a connecting horizontal rigid member pivotally interconnecting the upper ends of said vertical members wherein said members together with said frame form a pivotal parallelogram, means for suspending the rear of a boat between the rear vertical members, means for suspending the front end of a boat from the horizontal member, and means for pivoting said members about their pivotal axes, thereby raising and lowering the boat in relation to the wheeled frame, said means for pivoting said members about their axes including a winch drum on said forward vertical member adjacent the bottom thereof, a flexible cable attached to said drum and having one end connected to one of said rear vertical members in vertically spaced relation to said pivotal connection between the frame and said one rear vertical member thereby permitting said rear vertical members to pivot to a rearwardly inclined position for raising and lowering a boat, said rear vertical members including forwardly extending bars for attachment of said cable.

9. A boat trailer comprising a wheeled frame, means for detachably securing the forward end of said frame to a towing vehicle, a pair of transversely spaced vertical members pivoted to said frame adjacent the rear thereof, a vertical member pivoted to said frame adjacent the front thereof, a connecting horizontal rigid member pivotally interconnecting the upper ends of said vertical members wherein said members together with said frame form a pivotal parallelogram, means for suspending the rear of a boat between the rear vertical members, means for suspending the front end of a boat from the horizontal member, and means for pivoting said members about their pivotal axes thereby raising and lowering the boat in relation to the wheeled frame, said means for suspending the front of the boat including a pulley freely longitudinally movable on said horizontal member, a flexible cable positioned over said pulley and having a free end adapted to be connected to a boat, a winch drum rotatably secured to said forward vertical member for winding the cable thereon for raising and lowering the front end of a boat, and a transverse cross-bar longitudinally adjustably mounted on said frame adjacent the front thereof, a boat resiliently and pivotally mounted on the upper surface of the cross-bar for engaging the undersurface of a boat adjacent the forward end thereof, said boat rest including chocks having outwardly and upwardly inclined surfaces for receiving the bottom of the boat.

10. A boat trailer comprising a wheeled frame, means for detachably securing the forward end of said frame to a towing vehicle, a pair of transversely spaced vertical members pivoted to said frame adjacent the rear thereof, a vertical member pivoted to said frame adjacent the rear thereof, a vertical member pivoted to said frame adjacent the front thereof, a connecting horizontal rigid member pivotally interconnecting the upper ends of said vertical members wherein said members together with said frame form a pivotal parallelogram, means for suspending the rear of a boat between the rear vertical members, means for suspending the front end of a boat from the horizontal member, and means for pivoting said members about their pivotal axes thereby raising and lowering the boat in relation to the wheeled frame, said means for suspending the front of the boat including a pulley freely longitudinally movable on said horizontal member, a flexible cable positioned over said pulley and having a free end adapted to be connected to a boat, a winch drum rotatably secured to said forward vertical member for winding the cable thereon for raising and lowering the front end of a boat, and a transverse cross-bar longitudinally adjustably mounted on said frame adjacent the front thereof, a boat rest resiliently and pivotally mounted on the upper surface of the cross-bar for engaging the undersurface of a boat adjacent the forward end thereof, said boat rest including chocks having outwardly and upwardly inclined surfaces for receiving the bottom of the boat, said means for pivoting said members about their axes including a winch drum on said forward vertical member adjacent the bottom thereof, a flexible cable attached to said drum and having one end connected to one of said rear vertical members in vertically spaced relation to said pivotal connection between the frame and said one rear vertical member thereby permitting said rear vertical members to pivot to a rearwardly inclined position for raising and lowering a boat.

11. A boat trailer comprising a wheeled frame, means for detachably securing the forward end of said frame to a towing vehicle, a pair of transversely spaced vertical members pivoted to said frame adjacent the rear thereof, a vertical member pivoted to said frame adjacent the front thereof, a connecting horizontal rigid member pivotally interconnecting the upper ends of said vertical members wherein said members together with said frame form a pivotal parallelogram, means for suspending the rear of a boat between the rear vertical members, means for suspending the front end of a boat from the horizontal member, and means for pivoting said members about their pivotal axes thereby raising and lowering the boat in relation to the wheeled frame, said means for suspending the front of the boat including a pulley freely longitudinally movable on said horizontal member, a flexible cable positioned over said pulley and having a free end adapted to be connected to a boat, a winch drum rotatably secured to said forward vertical member for winding the cable thereon for raising and lowering the front end of a boat, and a transverse cross-bar longitudinally adjustably mounted on said frame adjacent the front thereof, a boat rest resiliently and pivotally mounted on the upper surface of the cross-bar for engaging the undersurface of a boat adjacent the forward end thereof, said boat rest including chocks having outwardly and upwardly inclined surfaces for receiving the bottom of the boat, said means for pivoting said members about their axes including a winch drum on said forward vertical member adjacent the bottom thereof, a flexible cable attached to said drum and having one end connected to one of said rear vertical members in vertically spaced relation to said pivotal connection between the frame and said one rear vertical member thereby permitting said rear vertical members to pivot to a rearwardly inclined position for raising and lowering a boat, said means for suspending a rear of a boat including a flexible sling member, and resilient means securing remote ends of said sling to said vertical members.

12. A boat trailer comprising a wheeled frame, means for detachably securing the forward end of said frame to a towing vehicle, a pair of transversely spaced vertical members pivoted to said frame adjacent the rear thereof, a vertical member pivoted to said frame adjacent the front thereof, a connecting horizontal rigid member pivotally interconnecting the upper ends of said vertical members wherein said members together with said frame form a pivotal parallelogram, means for suspending the rear of a boat between the rear vertical members, means for suspending the front end of a boat from the horizontal member, and means for pivoting said members about their pivotal axes thereby raising and lowering the boat in relation to the wheeled frame, said means for suspending the front of the boat including a pulley freely longitudinally movable on said horizontal member, a flexible cable positioned over said pulley and having a free end adapted to be connected to a boat, a winch drum rotatably secured to said forward vertical member for winding the cable thereon for raising and lowering the front end of a boat, and a transverse cross-bar longitudinally adjustably mounted on said frame adjacent the front thereof, a boat rest resiliently and pivotally mounted on the upper surface of the cross-bar for engaging the undersurface of a boat adjacent the forward end thereof, said boat rest including chocks having outwardly and upwardly inclined surfaces for receiving the bottom of a boat, said means for pivoting said members about their axes including a winch drum on said forward vertical member adjacent the bottom thereof, a flexible cable attached to said drum and having one end connected to one of said rear vertical members in vertically spaced relation to said pivotal connection between the frame and said one rear vertical member thereby permitting said rear vertical member to pivot to a rearwardly inclined position for raising and lowering a boat, said means for suspending a rear of a boat including a flexible sling member, and resilient means securing remote ends of said sling to said vertical members, said rear vertical members being rigidly interconnected at the tops thereof by a transverse brace bar, and a removable stabilizing bar extending between the lower ends of rear vertical members for retaining the rear vertical members in spaced relation.

References Cited in the file of this patent

UNITED STATES PATENTS

| | | |
|---|---|---|
| 1,464,131 | Goodger | Aug. 7, 1923 |
| 2,452,938 | Krake | Nov. 2, 1948 |
| 2,536,563 | Montgomery | Jan. 2, 1951 |
| 2,608,314 | Krider | Aug. 26, 1952 |

FOREIGN PATENTS

| | | |
|---|---|---|
| 470,114 | Great Britain | Aug. 10, 1937 |
| 901,517 | Germany | Jan. 11, 1954 |